United States Patent [19]

Wang et al.

[11] 3,849,764

[45] Nov. 19, 1974

[54] PROGRAMMABLE FREQUENCY DECODER

[75] Inventors: Kuei-Seng Wang, Flemington; Philip L. Epstein, Elizabeth; John Hsueh Chung Lu, East Orange, all of N.J.

[73] Assignee: Quindar Electronics, Inc., Springfield, N.J.

[22] Filed: May 29, 1973

[21] Appl. No.: 364,684

[52] U.S. Cl. .......... 340/171 R, 179/2 A

[51] Int. Cl. .......... H04q 9/12, H04m 11/00

[58] Field of Search .......... 340/171 R, 171 PF, 311; 179/2 A, 84 VF

[56] References Cited

UNITED STATES PATENTS

| | | | |
|---|---|---|---|
| 3,472,965 | 10/1969 | Blossom | 340/171 R |
| 3,613,004 | 10/1971 | Wycoff | 340/171 R |
| 3,774,114 | 11/1973 | Dahlgren | 340/311 X |

*Primary Examiner*—Donald J. Yusko
*Attorney, Agent, or Firm*—Morse, Altman, Oates & Bello

[57] ABSTRACT

A system for decoding a series of addressing digits arranged in a particular sequence, each addressing digit characterized by a multifrequency signal, is comprised of a plurality of drivers for sequentially forming tuned networks by grounding selected transformer taps, one of each tuned network responsive to one of each addressing digit frequencies. The system is enabled for transferring a control signal when the sequence of the addressing digits corresponds to the sequence in which the tuned networks are formed.

12 Claims, 4 Drawing Figures

PATENTED NOV 19 1974 3,849,764

SHEET 1 OF 3

| ADDRESS DIGIT | FIRST ADDRESSING DIGIT | SECOND ADDRESSING DIGIT | THIRD ADDRESSING DIGIT |
|---|---|---|---|
| 1 | 38-41<br>62-66 | 38-42<br>62-68 | 38-44<br>62-70 |
| 2 | 38-41<br>60-66 | 38-42<br>60-68 | 38-44<br>60-70 |
| 3 | 38-41<br>58-66 | 38-42<br>58-68 | 38-44<br>58-70 |
| 4 | 36-41<br>62-66 | 36-42<br>62-68 | 36-44<br>62-70 |
| 5 | 36-41<br>60-66 | 36-42<br>60-68 | 36-44<br>60-70 |
| 6 | 36-41<br>58-66 | 36-42<br>58-68 | 36-44<br>58-70 |
| 7 | 34-41<br>62-66 | 34-42<br>62-68 | 34-44<br>62-70 |
| 8 | 34-41<br>60-66 | 34-42<br>60-68 | 34-44<br>60-70 |
| 9 | 34-41<br>58-66 | 34-42<br>58-68 | 34-44<br>58-70 |
| 0 | 32-41<br>60-66 | 32-42<br>60-68 | 32-44<br>60-70 |

PROGRAMMABLE FREQUENCY DECODER

BACKGROUND OF THE INVENTION

1. Field of Invention

The present invention is related to detecting systems and, more particularly, is directed towards a programmable decoding system.

2. Description of the Prior Art

The use of decoding systems for controlling equipment at remote stations from a master station has increased over the past several years. The master station transmits a sequence of coded signals which are received at the remote station, each coded signal being characterized by multifrequency signals. The received signals are applied in parallel to a plurality of bandpass filters, each bandpass filter designed to respond to one of the coded signal frequencies. The coded signals are detected simultaneously and processed in associated electronic circuits for generation of appropriate control signals. Due to the fact that a band pass filter and associated electronic circuits are required for each coded signal frequency, such systems have suffered from the disadvantages that they are unduly complex in design and costly in production.

SUMMARY OF THE INVENTION

It is an object of the present invention to provide a simple and inexpensive decoding system which does not suffer from the heretofore mentioned disadvantages. The present invention provides a sequentially switched programmable decoding system for processing a series of addressing digits arranged in a particular sequence, each addressing digit characterized by multifrequency signals. The decoding system is comprised of programmable drivers for sequentially forming tuned networks by grounding selected transformer taps, one of each tuned network is responsive only to one of each addressing digit frequencies. The drivers operate to sequentially activate the tuned networks in a predetermined sequence for detecting predetermined addressing digit frequencies, the decoding system being pretuned for sequentially detecting selected addressing digit frequencies. The decoding system is enabled for transferring a control signal when the sequence of addressing digits corresponds to the predetermined sequence in which tuned networks are formed.

The invention accordingly comprises the apparatus possessing the construction, combination of elements, and arrangement of parts that are exemplified in the following detailed disclosure, the scope of which will be indicated in the accompanying claims.

BRIEF DESCRIPTION OF THE DRAWINGS

For a fuller understanding of the nature and objects of the present invention, reference should be had to the following detailes description taken in connection with the accompanying drawings wherein.

DETAILED DESCRIPTION OF INVENTION

Figure 1:
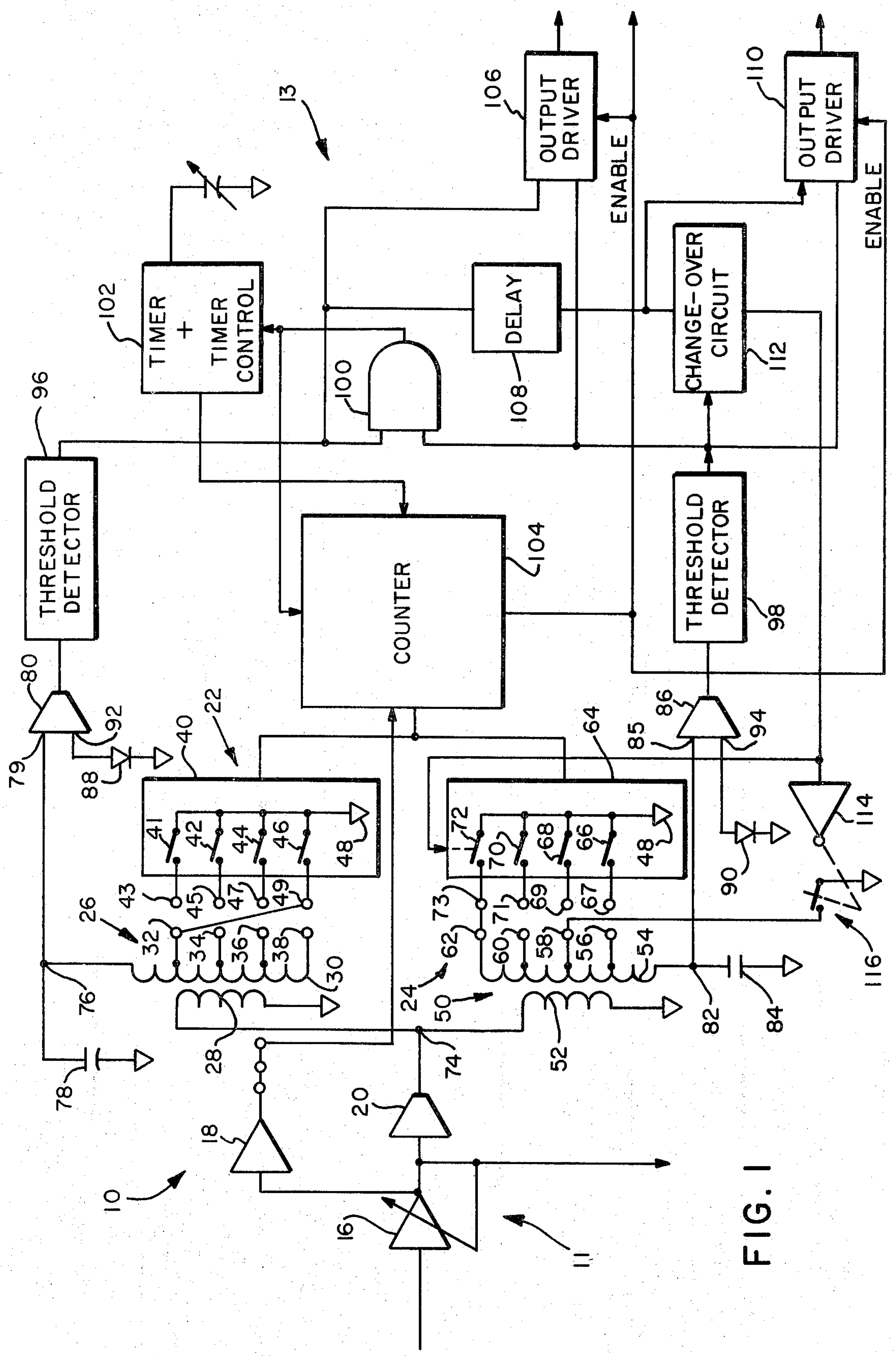
FIG. 1 is a block and schematic diagram of a decoding system embodying the present invention.

Referring now to the drawings, particularly FIG. 1, there is shown a decoding system 10 comprising an input section 11 and a processing section 13 for sequentially detecting a series of addressing digits arranged in a particular sequence. In the illustrated embodiments, each addressing digit is characterized by a multifrequency signal, for example a dual tone multifrequency signal of the type generated by a pushbutton telephone set.

Figures 2, 3:
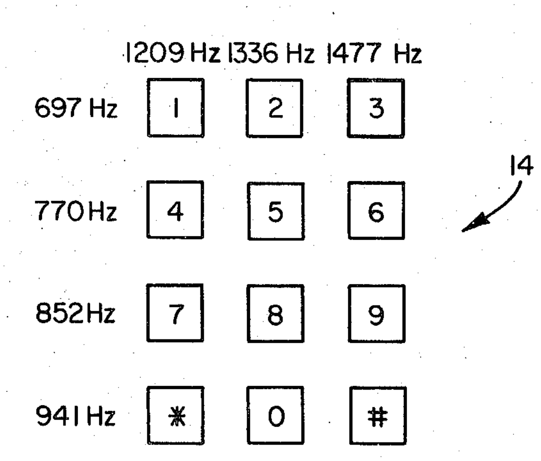
FIG. 2 is a diagramatic representation illustrating the frequencies comprising the dual tone multifrequency signals.
FIG. 3 is a diagramatic representation illustrating the interconnections between the transformer taps and switching devices of FIG. 1.

The conventional dual tone multifrequency telephone set generates twelve dual tone multifrequency signals comprised of seven discrete tones, four tones in the low-band and three tones in the high-band. The designation and arrangement of the twelve multifrequency signals and seven discrete tones are shown in FIGS. 2 and 3. Each dual tone multifrequency signal is generated by selectively activating one of a plurality of switches 14 arranged in a four-by-three matrix. For clarity, switches 14 have been provided with conventional nomenclature, i.e., digits one through zero and special functions * and #, each switch 14 representing an address digit. Each dual tone multifrequency signal is comprised of two tones, one from the low-band and one from the high-band. For example, the dual tone multifrequency signal generated by activating the switch denoted 1 comprises 697 Hz and 1209 Hz frequencies; the dual tone multifrequency signal generated by activating the switch denoted 8 comprises 852 Hz and 1336 Hz; and so forth.

Dual tone multifrequency addressing digits arranged in a particular sequence and a control signal ( # or * ) are received at input section 11 comprising an automatic gain control amplifier 16 which operates to maintain the signal at an output terminal thereof at a constant level. The multifrequency signal at the output terminal of automatic gain control amplifier 16 is applied to processing section 13 comprising a noise channel amplifier 18; a limiter amplifier 20; programmable decoder assemblies 22, 24; comparators 80, 86; threshold detectors 96, 98; a logic unit 100; a timer assembly 102; a counter 104; a delay unit 108; output drivers 106, 110; and a change-over circuit 112. As hereinafter described, noise channel amplifier 18 operates to reset decoding system 10 when an illegitimate signal is applied to automatic gain control amplifier 16. The multifrequency signal is amplified in limiter amplifier 20, which is operated in saturation, and applied to programmable decoder assemblies 22 and 24. Programmable decoder assembly 22 comprises transformer 26 including a primary winding 28 and a multiple tap secondary winding 30 having taps 32, 34, 36 and 38 and a driver assembly 40 including switching devices 41, 42, 44 and 46. One side of switching devices 41, 42, 44 and 46 are connected to terminals 43, 45, 47, 49, respectively, and the other sides thereof are connected to a return 48, for example ground. As hereinafter described, certain ones of taps 32, 34, 36 and 38 are sequentially connected to ground when selected switching devices 41, 42, 44 and 46 are energized, predetermined taps 32, 34, 36, 38 and terminals 43, 45, 47 and 49 being interconnected. Programmable decoder assembly 24 comprises a transformer 50 including a primary winding 52 and a multiple tap secondary winding 54 having taps 56, 58, 60 and 62 and a driver assembly 64 including switching devices 66, 68, 70 and 72. One side of switching devices 66, 68, 70 and 72 is connected to terminals 67, 69, 71 and 73, respectively, and the other sides thereof are connected to return 48. Certain ones of taps 56, 58, 60 and 62 are sequentially connected to ground when selected switching devices 66, 68, 70 and 72, are energized, predetermined taps 56, 58, 60, 62 and terminals 67, 69, 71 73 being interconnected. The interconnections among the switching devices and taps in decoder assemblies 22 and 24 for various addressing digit sequences are shown in FIG. 3. From the foregoing, it will be readily appreciated that the switching devices are energized in a predetermined sequence and that the selected tun d networks are formed sequentially in accordance with the coded interconnections illustrated in FIG. 3.

The multifrequency signal at the output terminal of limiter amplifier 20 is applied to a common junction 74 of one side of primary windings 28 and 52. The other sides of primary windings 28 and 52 are connected to return 48. One side of secondary winding 30 is connected to tap 38 and the other side thereof is connected at a junction 76 of one side of a capacitor 78 and an input terminal 79 of comparator 80. The other side of capacitor 78 is connected to return 48. It will be readily appreciated that a tuned network, an LC bandpass filter, is formed when a selected tap of secondary winding 30 is grounded. One side of secondary winding 54 is connected to tap 62 and the other side thereof is connected to a junction 82 of one side of a capacitor 84 and an input terminal 85 of comparator 86. It will be readily appreciated that a tuned network, an LC bandpass filter, is formed when a selected tap of secondary winding 54 is grounded.

An input terminal 92 of comparator 80 and an input terminal 94 of comparator 86 are connected to return 48 by means of diodes 88 and 90, respectively. Diode 88 and 90, for example silicon diodes having a forward bias voltage in the 0.6 to 0.7 volt range, operate to bias their associated comparator in such a manner that only signals applied to input terminals 79 and 85 having a voltage amplitude greater than the bias voltage will pass through the correlative comparator. The output terminals of comparators 80 and 86 are connected to threshold detectors 96 and 98, respectively. The signals at the output terminals of threshold detectors 96 and 98 are applied to logic unit 100, for example an AND gate, which generates a signal for controlling timer assembly 102. Timer assembly 102 is idled when a legitimate signal is received. Otherwise, timer assembly 102 is in a state of free running and resets counter 104 at a regular interval basis. Therefore, when the next signal does not register within this predetermined interval (Inter-digit interval), decoding system 10 resets itself. This arrangement produces a maximum immunity to noise hits because the probability of noise hits that have an identical characteristic is extremely low. A control signal generated by time assembly 102 is applied to counter 104, which selectively activates driver assemblies 40 and 64, counter 104 having 00, 01, 10 and 11 states. The output terminals of threshold detectors 96 and 98 are connected also to the input terminals of output driver 106, which is enable by a full count signal generated by counter 104. The output terminal of threshold detector 96 is further connected to delay unit 108. The output terminal of delay unit 108 is connected to the input terminal of output driver 110 and changeover circuit 112. Another input terminal of driver 110 is connected to the output terminal of threshold detector 98, driver 110 being enabled by the full count signal generated by counter 104. The output terminal of change-over circuit 112 is connected to an inverter 114, which controls the operation of a switching device 116 for grounding tap 58. Change-over circuit 112 is used to eliminate one more pair of LC tank circuits. Al the address digits are predictable and therefore they are programmable. However, the control signals, which may either be a * or a # following the addressing digits, are not predictable. Change-over circuit 112, after receiving the control signal for a few milliseconds, determines which of the switches in driver assembly 64 should be activated, whereby the legitimate control signal can be transferred to output driver 106.

OPERATION

In the following exemplary discussion of system operation, a multifrequency input signal comprising a series of three addressing digits and a control signal trip (*) or close (#) generated by a pushbutton telephone set, for example, is applied to automatic gain control amplifier 16. The addressing digits are arranged in a sequence which corresponds to the sequence in which drivers 40 and 64 are energized for sequentially forming the tuned networks. The first addressing digit at the input terminal of automatic gain control amplifier 16 is applied to primary windings 28 and 52 via limiter amplifier 20. In the illustrated embodiment, programmable decoder assembly 22 detects the low-band frequencies of the addressing digits and programmable decoder assembly 24 detects the high-band frequencies of the addressing digits. Appropriate switching devices in drivers 40 and 64 are activated and the low frequency signal of the first addressing digit is passed through decoder assembly 22 and is applied to AND gate 100 via comparator 80 and threshold detector 96, and the high frequency signal of the first addressing digit is passed through decoder assembly 24 and is applied to AND gate 100 via comparator 86 and threshold detector 98. The signal at the output of AND gate 100 is applied to timer 102, which is idled. The combined outputs of the high and low band signals advance the counter 104 to the 01 state. Counter 104 is initially reset to the 00 state either by timer 102 or by the completion of control. Counter 104 generates a command signal to driver assemblies 40 and 64 for selectively energizing the switching devices therein. The second addressing digit is processed in a similar manner to the processing of the first addressing digit. After the second addressing digit is passed through decoder assmeblies 22 and 24, counter 104 is set to the 10 state. Switching devices in driver assemblies 40 and 64 are selectively energized and readied for processing the third addressing digit. The third addressing digit is processed in a similar manner to the processing of the first two addressing digits. After the third addressing digit is processed, counter 104 is set to the 11 state, or full count state, and the switching devices in driver assemblies 40 and 64 are readied to receive the control signal.

As shown in FIG. 2 the trip (*) and close (#) control signal share the common low-band frequency 941 Hz. Tap 32 is connected to terminal 49 and tap 62 is connected to terminal 73. With this arrangement, decoder assemblies 22 and 24 are programmed to detect the 941 Hz and 1209 Hz frequencies after the proper sequence of addressing digits has been received and processed. If the control signal is trip (*), the lowband frequency 941 Hz is passed through decoder assembly 22 and is processed in comparator 80 and threshold detector 96; and the high-band frequency 1209 Hz is passed through decoder assembly 24 and is processed in comparator 86 and threshold detector 98. The signals at the output terminals of threshold detectors 96 and 98 are applied to output driver 106, which is enabled by the full count signal generated by counter 104. Output driver 106 generates a trip (*) signal for control of external equipment. If the control signal is close ( # ), the low-band 941 Hz frequency is passed through decoder assembly 22 and is processed in comparator 80 and threshold detector 96. Since decoder assembly 24 is programmed to pass the high-band 1209 Hz frequency, the high-band 1477 Hz frequency of the close signal does not pass therethrough. The signal at the output terminal of threshold detector 96 activates delay unit 108, which sets change-over circuit 112. A control signal generated by change-over circuit 112 energizes switching device 116. In consequence, tap 58 is grounded and decoder assembly 24 is programmed to detect the high-band 1477 Hz frequency. The 1477 Hz frequency is passed through decoder assembly 24 and processed in comparator 86 and threshold detector 98. The high-band signal at the output of threshold detector 98 and the low-band signal at the output of delay unit 108 are applied to the input terminals of output driver 110, which is enabled by the full count signal generated by counter 104. Output driver 110 generates a close ( # ) signal for control of external equipment. From the foregoing, it will be readily appreciated that decider assemblies 22 and 24 are programmed and sequentially switched for processing multifrequency tone signals. For a fuller understanding of the invention, references should be had to the detailed schematic diagram of FIG. 4.

Figure 4:
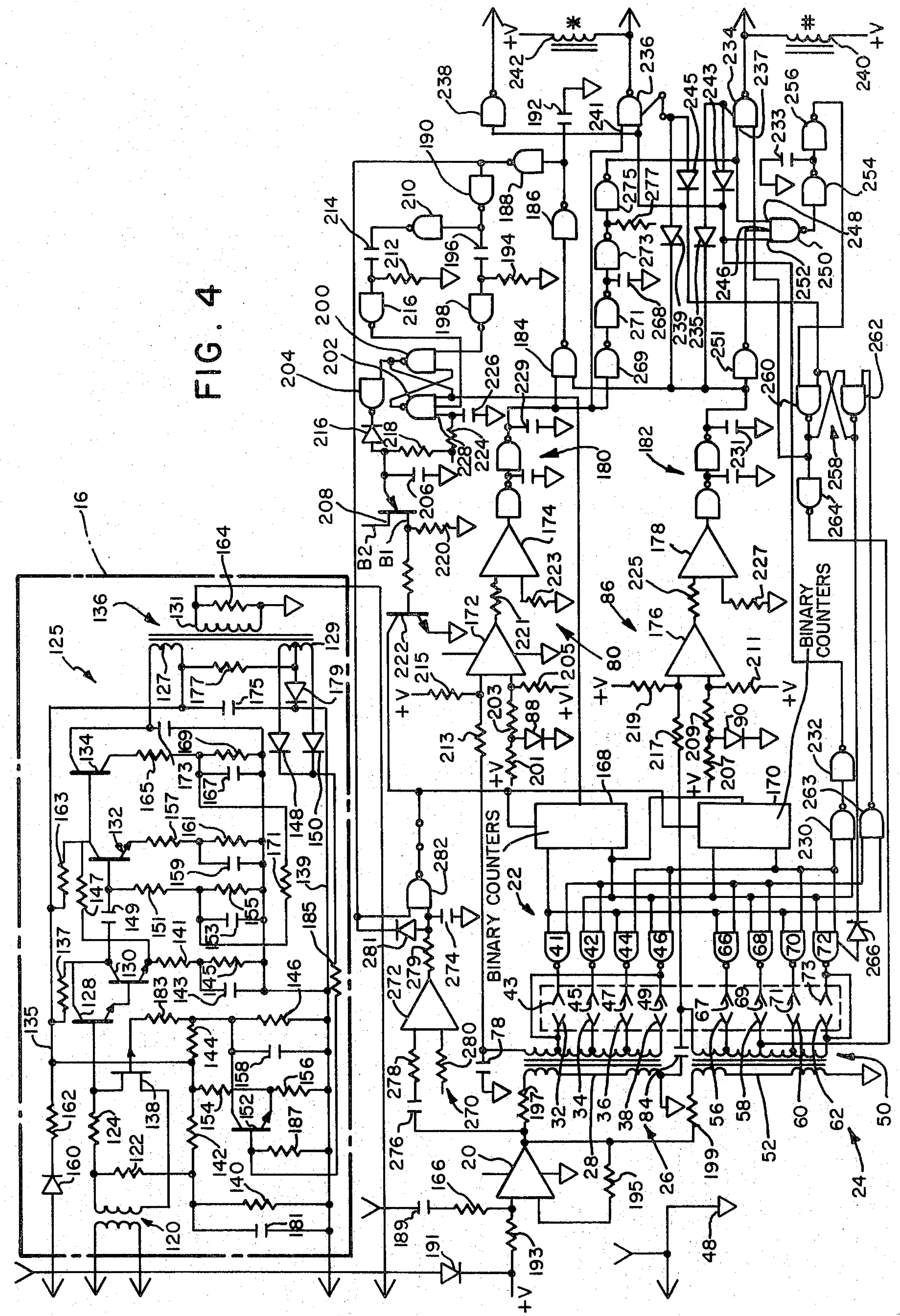
FIG. 4 is a detailed schematic diagram of FIG. 1.

Referring now to FIG. 4, it will be seen that the three addressing digit signals and the control signal generated by the pushbutton telephone set are applied to a transformer 120. A resistor 122 is connected across transformer 120 to provide a 600 ohm input impedance for automatic gain amplifier 16. The signal coupled through transformer 120 is fed through a resistor 124 to a linear amplifier 125 comprising transistors 128, 130, 132 and 134. The amplified signal is then coupled through a transformer 136, having a primary winding 127, and secondary windings 129 and 131, to limiter amplifier 20. The collector contacts of transistors 128 and 130 are connected to a supply line 135 via a resistor 137. The emitter contact of transistor 128 is connected to the base contact of transistor 130. The emitter contact of transistor 130 is connected to a return line 139 via a resistor 141 in series with a capacitor 143 and a resistor 145 in parallel. The emitter contact of transistor 130 is connected also to the collector contact of transistor 132 via a resistor 147. The collector contact of transistor 130 is coupled to the base contact of transistor 132 via a capacitor 149. The base contact of transistor 132 is connected to return line 139 via a resistor 151 in series with a capacitor 153 and a resistor 155 in parallel. The emitter contact of transistor 132 is connected to return line 139 via a resistor 157 in series with a capacitor 159 and a resistor 161 in parallel. The collector contact of transistor 132 is connected to supply line 135 via a resistor 163 and to the base contact of transistor 134. The emitter contact of transistor 134 is connected to return line 139 via a resistor 165 in series with a capacitor 167 and a resistor 169 in parallel. The junction of resistors 165 and 169 is connected to the junction of resistors 151 and 155 via a resistor 171. The collector contact of transistor 134 is connected to common return line 139 via a capacitor 173 and to one side of primary winding 127 of transformer 136. The other side of primary winding 127 is connected to supply line 135 and is connected to return line 139 via a capacitor 175. The other side of primary winding 127 is also connected via a resistor 177 to a center tap of secondary winding 129 which is further connected to return line 139 via a diode 179.

The first stage of the linear amplifier 125 includes transistors 128 and 130 connected in a Darlington configuration to provide a high input impedance. Control of amplifier 125 gain is accomplished by a field effect transistor 138, which acts as a shunt element across the amplifier input, the shunt channel resistance of field effect transistor 138 is such that the voltage at the input of transistor 128 is maintained at a constant level. The source of field effect transistor 138 is biased to a positive value by a voltage divider composed of resistors 140 and 142, a capacitor 181 connected between the junction of resistors 140, 142 and return line 139. The gate of field effect transistor 138 is biased to an even higher positive voltage by a voltage divider consisting of resistors 144 and 146. The positive voltage on the gate of field effect transistor 138 which is applied thereto via a resistor 183, raises the effective channel resistance to a very high value (in excess of 1 megohm), so that there is a negligible loading effect on the input of linear amplifier 125.

A portion of the amplifier output is taken from secondary winding 129 of transformer 136 and rectified by diodes 148 and 150 to provide a positive voltage, which is proportional to the level of the amplifier output. This positive voltage is applied to the base contact of transistor 152 via a resistor 185, transistor 152 operates as a control amplifier for field effect transistor 138. The emitter contact of transistor 152 is biased to approximately +4.6 volts by a voltage divider consisting of resistors 154 and 156. A resistor 187 is connected between the base contact of transistor 152 and return line 139. If the rectified output voltage from diodes 148 and 150 exceeds the value of this bias voltage, transistor 152 conducts. The conduction of transistor 152 lowers the voltage at the junction of resistors 144 and 146, and lowers the voltage on the gate of field effect transistor 138. In consequence, the effective resistance of field effect transistor 138 decreases and shunts the input of linear amplifier 125. The input signal to and the output signal of linear amplifier 125 is reduced so that transistor 152 is barely conducting. In this way, the input signal to linear amplifier 125 is always maintained at a level just sufficient to maintain the output signal at the desired level. The voltage on the gate of field effect transistor 138 is dependent upon a capacitor 158. When transistor 152 conducts, as a result of the output signal exceeding the threshold level, capacitor 158 is rapidly discharged through the relatively low resistance of the conducting transistor, whereby the gain of linear amplifier 125 is reduced very rapidly. This fast action results in an attack time of less than 5 milliseconds for the gain control circuit. However, if the signal level suddenly drops below threshold, capacitor 158 must be charged up through the high resistance of the divider consisting of resistors 144 and 146. As a result, the gain of linear amplifier 125 recovers slowly, producing a desirable long release tim, in the order of one second.

A diode 160 is provided in supply line 135 to prevent damage in the event that the power supply is inadvertently reversed. A dropping resistor 162, also in the supply line 135, reduces the operating voltage of the unit to approximately 9 volts. By selecting the proper value for resistor 162, linear amplifier 125 may be operated from any supply voltage between 12 and 48 volts. Linear amplifier 125 output impedance is stabilized by a resistor 164, which is shunted across secondary 131 of transformer 136. The positive power supply is connected to +V of processing section 13.

Although one processing section 13 is shown, it is to be understood that, in alternative embodiments, one input section 11 is connected to more than one processing section 13. The output signal from transformer 136 is coupled via a capacitor 189 to all processing sections 13, which share the same input section 11, a resistor 166 provides a high input impedance to the processing sections. Therefore, when several processing sections 13 are connected together, automatic gain control amplifier 16 will not be loaded down. The signal is further amplifier by saturation amplifier 20 having a feedback resistor 195, in order to build up enough power to drive programmable tone decoder assemblies 22 and 24. The signal at the output terminal of saturation amplifier 20 is applied to programmable tone decoder assemblies 22 and 24 via resistors 197 and 199, respectively.

As previously indicated, programmable tone decoder assemblies 22 and 24 comprise transformer 26 and driver assembly 40, and transformer 50 and driver assembly 64, respectively. In the illustrated embodiment, switching devices 41, 42, 44, 46, 66, 68, 70 and 72 are drivers, for example NAND gates, and counter 104 includes 2-bit modulo-4 counters 168 and 170. Transformer 26 and its associated drivers 41, 42, 44 and 46 detect only low group frequencies; transformer 50 and its associated drivers 66, 68, 70 and 72 detect only the high group frequencies. Each decoder assembly is preprogrammed by connecting the transformer tap to the proper driver according to the address interconnections shown in FIG. 3. When one of the drivers is activated, its associated transformer tap is at the signal ground, and a tuning network is formed. The detected frequency is applied to the comparators 80 and 86 which include comparators 172, 174 and 176, 178, for the low group frequencies and the high group frequencies, respectively. The bias network at terminal 92 of comparator 80 includes diode 88 and resistors 201, 203 and 205; and the bias network at terminal 94 of comparator 86 includes diode 90 and resistors 207, 209 and 211. Terminals 79 and 85 are provided with resistors 213, 215 and 217, 219, respectively. A resistor 221 is connected between the output terminal of comparator 172 and one input terminal of comparator 174, the other input terminal of comparator 174 is connected to return 48 via a resistor 223. A resistor 225 is connected between the output terminal of comparator 176 and one input terminal of comparator 178, the other input terminal of comparator 178 is connected to return 48 via a resistor 227.

The tone decoder is programmed by the 2-bit counters 168 and 170. Both counters are initially reset to zeros, i.e., state 00. The end of the first addressing digit signal sets counters 168 and 170 to state 01, the end of the second addressing digit sets counters 168 and 170 to state 10, the end of the third addressing digit sets counters 168 and 170 to state 11, and the end of the fourth signal (the control signal) resets counters 168 and 170 to zeros again.

Since the transformer taps are prestrapped to the drivers, according to the predetermined sequence and numbers, programmable tone detector assemblies 22 and 24 are always pretuned to the expected signal. Incorrect signal tone bursts will not be detected and will not change counter 168 and 170 states. The drivers also serve as a decoder for the binary counter output, thus the drivers can only be activated one at a time and in sequence.

When no signal appears at the input of comparators 172 and 176, the output of these comparators is at +12v. The signals output terminals of comparators 174 and 178, which follow comparators 172 and 176, respectively, are at ground potential. The output of two-stage integrators 180 and 182 are also at ground potential. The high band pass frequencies are processed by integrator 182 and the low band pass frequencies are processed by integrator 180. A capacitor 229 is connected between the output terminal of integrator 180 and return 48 and a capacitor 231 is connected between the output terminal of integrator 182 and return 48. Integrators 180 and 182 convert squarewave signals at the output terminals of comparators 174 and 178 into d-c voltages. When the signal at the output terminals of integrators 180 and 182 are at a high potential, the signal at the output of a NAND gate 184 is at logic 0.

The negative-going logic signal at the output terminal of NAND gate 184 propagates through NAND gates 186, 188 and 190, and appears at the output of NAND gate 190 as a positive-going signal due to the three consecutive inversions, the signal being slightly integrated by a capacitor 192. The integration is provided to eliminate the race conditions, which may be caused if the two input signals of NAND gate 184 do not rise and fall exactly the same. The positive-going pulse at the output of NAND gate 190 is differentiated by an RC circuit including a resistor 194 and a capacitor 196. The differentiated pulse is inverted by a NAND gate 198 and applied to timer assembly 102. This differentiated pulse resets timer assembly 102, for example a control flip-flop comprised of NAND gates 200 and 202. When control flip-flop 102 is reset, the potential at the output of NAND gate 200 is at logic 1, which causes the output terminal of a NAND gate 204 to be at logic 0. The logic 0 at the output of NAND gate 204 discharges a storage capacitor 206 and holds the emitter of a unijunction transistor 208 at a low potential (approximately 0.6v). Thus transistor 208 is reversed biased and only a negligible current flows from B2 to B1.

The signal at the output terminal of NAND gate 190 is further inverted by a NAND gate 210. Thus, the signal at the output terminal of NAND gate 210 is negative-going when the addressing digit first appears, and is positive-going when the same signal starts to disappear. The positive-going signal at the output terminal of NAND gate 210 is differentiated by a resistor 212 and a capacitor 214, and inverted by a NAND gate 216. The negative-going pulse at the output of NAND gate 216 sets control flip-flop 102, which, in turn, advances 2-bit counters 168 and 170. In consequence, the counter is always advanced by the ending of the addressing digit and control signal. The setting of control flip-flop 102 causes the output of NAND gate 200 to be a logic 0, the potential at the output terminal of NAND gate 204 being almost +11Vdc. This high potential reverse biases a silicon diode 216, thus no conduction occurs between the output of NAND gate 204 and the cathode of diode 216. Capacitor 206 is charged through a resistor 218. The time constant of capacitor 206 and resistor 218 is predetermined by the interdigit interval, i.e., the time interval between adjacent addressing digits. When there is no subsequent signal coming in to reset control flip-flop 102 within the predetermined interdigit time interval, capacitor 206 accumulates enough charge and forward biases unijunction transistor 208, which immediately conducts. The resulting short duration current flows from B2 to signal ground through a resistor 220. This current is large enough to cause a transistor 222 to conduct and a negative-going pulse appears at the collector contact thereof. In consequence 2-bit counters 168 and 170 are instantaneously reset. The reset action is also initiated when power is applied to the unit. This assures that control flip-flop 102 is always set in the manner that the timer runs continuously, only stopped by the appearance of a signal, its period being the interdigit time interval. This assurance is attributed to an RC network comprised of a resistor 224 and a capacitor 226. When the power is first applied, capacitor 226 is temporarily short-circuited to ground, whereby control flip-flop 102 is set by ground potential of capacitor 226 through an input terminal 228 of NAND gate 202. The time constant of this RC network is tailored so that before the voltage across the capacitor 226 reaches full amplitude, control flip-flop 102 status is not affected by the transient action of other components.

As mentioned earlier, at the end of each addressing digit, counters 168 and 170 are advanced one position. At the end of the third addressing digit, counters 168 and 170 are advanced to the 11 state. The 11 state is detected by serially connected NAND gates 230 and 232. The signal generated by NAND gate 232 is used to qualify output relay drivers 234 and 236, change-over circuit 112, and turn on an echo back transmitter driver 238. Relay drivers 234 and 236 operate to energize output relays 240 and 242, respectively, output relay 240 generating the # signal and output relay 242 generating the * signal. Echo back transmitter driver 238 operates to key an AM tone transmitter for confirmation of correct address decoding. The * output is qualified by the full count signal generated by counter 104 and the signal generated by 941 Hz change-over circuit 112. The # output is qualified by the full count signal generated by counter 104 and a complementary signal generated by 941 Hz change-over circuit 112. It is to be noted that output driver 234 is enabled when a logic 1 at the output terminals of integrator 182 and NAND gate 275 is applied thereto via diode 235 and directly to a terminal 237, respectively, and output driver 236 is enabled when a logical 1 at the output terminals of integrators 182 and 180 is applied thereto via diode 239 and directly to a terminal 241, respectively. A diode 243 inhibits output driver 234 until change-over circuit 112 is activated and a diode 245 inhibits output driver 236 after change-over circuit 112 is activated.

As previously described, decoding system 10 detects four consecutive dual-tone signals. The first three signals are addressing digits and are preprogrammed, the fourth signal is the control signal. Delay circuit 108 and change-over circuit 112 are used to detect the control signal. Tap 32 of transformer 26 is permanently connected to terminal 49 of driver 46 of the low group tone decoder assembly 22. Tap 62 of transformer 50 is permanently connected to terminal 73 of driver 72 of the high group tone decoder assembly 24. With this arrangement, decoder system 10 is preprogrammed for the 941 Hz and 1209 Hz frequencies and is ready to detect the * signal after the previous three addressing digit signals have been processed. If the control signal is a *, the 941 Hz and 1209 Hz frequencies, it is passed through to relay 242, which remains energized a long as the signal is present. If the control signal is # , the 941 Hz and 1477 Hz frequencies, the preprogrammed 1209 Hz frequency is absent while the 941 Hz frequency is present. The absence of the 1209 Hz signal causes the signal at the output terminal of a NAND gate 251 to be at logic 1. Thus, the absence of the 1209 Hz frequency and the presence of 941 Hz frequency sets the signals at the input terminals 246 and 248 of a NAND gate 250 to logic 1. The input terminal 246 is connected to the output terminal of NAND gate 251. A third input terminal 252 of NAND gate 250 is at the output of NAND gate 232. At this moment, the signal at the output terminal of NAND gate 232 is also a logic 1. In consequence, the signal at the output terminal of NAND gate 250 is at logic 0. A change-over flip-flop 258, comprised of NAND gates 260 and 262, is set by this logic 0 signal which is applied thereto via serially connected NAND gates 254 and 256, a capacitor 233 is connected between the output terminal of NAND gate 254 and return 48. Change-over flip-flop 258 is enable when the full count signals generated by counters 168 and 170 are applied thereto via a NAND gate 263. When the signal at the output terminal of NAND gate 260 is logical 1, driver 234 of relay 240 is enabled and tap 58 of transformer 50 is brought to signal return via a NAND gate 264. Pregrounded tap 62 of transformer 50 is lifted from ground by the logic 0 at the output terminal of NAND gate 262, which is connected to NAN gate 72 via a diode 266. In consequence, transformer 50 is programmed to detect the 1477 Hz frequency and output relay 240 is energized.

A delay is introduced into the low frequency signal path by a capacitor 268 in order for the circuit to make the change-over decision. Delay unit 108 includes NAND gates 269, 271, 273 and 275, a bias voltage being applied to the input terminal of NAND gate 275 via a resistor 277. In the illustrated embodiment, the delay is approximately 15 msec.

A noise channel 270, comprised of a comparator 272, capacitors 274, 276, resistors 278, 279 and 280, a diode 281, and a NAND gate 282, operates to reset counters 168 and 170 when an illegitimate signal is received. Noise channel 270 monitors the input signal and compares it with the decoded signal at the output terminal of NAND gate 188 via NAND gate 282. If tehse signals are not coincident, the signal at the output terminal of NAND gate 282 goes to logic 0, which, in turn, resets 2-bit counters 168 and 170. The comparison time is approximately 100 msec.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A decoding system comprising:

a. input means adapted to receive a series of multifrequency signals arranged in a particular sequence, each said multifrequency signal including one frequency from a first group of frequencies and one frequency from a second group of frequencies;

b. first and second decoding means operatively connected to said input means, said first decoding means including first and second tuned networks, said second decoding means including at least third and fourth tuned networks, said first tuned network responsive to a first frequency in said first group of frequencies, said second tuned network responsive to a second frequency in said first group of frequencies, said third tuned network responsive to a first frequency in said second group of frequencies, said fourth tuned network responsive to a second frequency in said second group of frequencies;

c. control means operatively connected to said first and second decoding means for selectively forming said first, second, third and fourth tuned networks in a particular sequence; and d. output means operatively connected to said control means and said first and second decoding means for generating a command signal, said output means generating said command signal when the frequencies in the sequence of said multifrequency signals applied to said input means corresponds to the frequencies to which said first, second, third, and fourth tuned networks are sequentially responsive.

2. The decoding system as claimed in claim 1 wherein said first decoding means includes transformer means and driver means, said transformer means including at least first and second taps, said driver means including at least first and second drivers, said first and second taps selectively connected to said first and second drivers, said control means operating to sequentially energize said first and second drivers in a predetermined sequence, said first tuned network formed when said first driver is energized, said second tuned network formed when said second driver is energized.

3. The decoding system as claimed in claim 1 wherein said second decoding means includes transformer means and driver means, said transformer means including at least first and second taps, said driver means including at least first and second drivers, said first and second taps selectively connected to said first and second drivers, said control means operating to sequentially energize said first and second drivers in a predetermined sequence, said third tuned network formed when said first driver is energized, said fourth tuned network formed when said second driver is energized.

4. The decoding system as claimed in claim 1 wherein said first decoding means includes first transformer means and first driver means and wherein said second decoding means includes second transformer means and second driver means, each said first and second transformer means including a plurality of taps and each of said first and second driver means including a plurality of drivers, selected ones of said first driver means drivers connected to selected ones of said first transformer means taps, selected ones of said second driver means drivers connected to selected ones of said second transformer means taps, said control means operating to sequentially energize selected driver pairs of said first and second driver means in a predetermined sequence, each said driver pair including at least one driver in said first driver means and at least one driver in said second driver means, said first and third tuned networks formed when a first driver pair is energized, said second and fourth tuned networks formed when a second driver pair is energized.

5. The decoding system as claimed in claim 4 including:

a. first detecting means operatively connected to said first decoding means for generating a first control signal when one of the frequencies of the multifrequency signal corresponds to the frequency at which said first decoding means is responsive;

b. second detecting means operatively connected to said second decoding means for generating a second control signal when one of the frequencies of the frequency of the multifrequency signal corresponds to the frequency at which said second decoding means is responsive;

c. logic means operatively connected to said first and second detecting means for generating a third control signal when said first and second control signals are applied thereto;

d. timer means operatively connected to said logic means for generating a fourth control signal, said timer means enabled by said third control signal; and e. counter means operatively connected to said timer means, said first and second decoding means, and output means, said counter means responsive to said fourth signal, said counter means generating a fifth control signal for sequentially energizing selected driver pairs in a predetermined sequence, said counter means enabling said output means when the frequencies in the sequence of said multifrequency signals applied to said input means cor responds to the frequencies to which said first, second third and fourth tuned networks are sequentially responsive.

6. The decoding system as claimed in claim 5 including change-over circuit means operatively connected to said first and second detecting means, said change-over circuit means operating to energize said second decoding means for forming a tuned network responsive to a frequency in said second group of frequencies, said change-over circuit means enabled by said first detecting means.

7. The decoding system as claimed in claim 1 wherein said control means includes counter means operatively connected to said first and second decoding means, said counter means generating control signals for sequentially energizing said first and second decoding means, said counter means enabling said output means when the frequencies in the sequence of said multifrequency signals applied to said input means corresponds to the frequencies to which said first, second, third and fourth tuned networks are responsive.

8. A decoding system comprising:

a. input means adapted to receive a series of multifrequency signals arranged in a particular sequence, said series of multifrequency signals including at least three addressing digit signals and at least one control signal, each said addressing digit signal and said control signal characterized by at least one frequency in a first group of frequencies and at least one frequency in a second group of frequencies;

b. at least first and second decoding means operatively connected to said input means, said first decoding means including at least first and second tuned networks, said second decoding means including at least third and fourth tuned networks, said first tuned network responsive to a first frequency in said first group of frequencies, said second tuned network responsive to a second frequency in said first group of frequencies, said third tuned network responsive to a first frequency in said second group of frequencies;

c. control means operatively connected to said first and second decoding means for selectively forming said first, second, third and fourth tuned networks in a particular sequence; and d. output means operatively connected to said control means and said first and second decoding means for generating a command signal representing said control signal, said output means generating said command signal when the frequencies in the sequence of said addressing digit signals applied to said input means corresponds to the frequencies to which said first, second, third, and fourth tuned networks are sequentially responsive.

9. The decoding system as claimed in claim 8 wherein said first decoding means includes first transformer means and first driver means and wherein said second decoding means includes second transformer means and second driver means, each said first and second transformer means including a plurality of taps and each said first and second driver means including a plurality of drivers, selected ones of said first driver means drivers connected to selected ones of said first transformer means taps, selected ones of said second driver means drivers connected to selected ones of said second transformer means taps, said control means operating to sequentially energize selected driver pairs of said first and second driver means in a predetermined sequence, each said driver pair including at least one driver in said first driver means and at least one driver in said second driver means, said first and third tuned network means formed when a first driver pair is energized, said second and fourth tuned network means formed when a second driver pair is energized.

10. The decoding system as claimed in claim 9 including:

a. first detecting means operatively connected to said first decoding means for generating a first signal when one of the frequencies of said multifrequency signal corresponds to the frequency at which said first decoding means is responsive;

b. second detecting means operatively connected to said second decoding means for generating a second signal when one of the frequencies of said multifrequency signal corresponds to the frequency at which said second decoder means is responsive;

c. logic means operatively connected to said first and second detecting means for generating a third signal when said first and second signals are applied thereto;

d. timer means operatively connected to said logic means for generating a fourth signal, said timer means enabled by said third signal; and e. counter means operatively connected to said timer means, said first and second decoding means, and output means, said counter means responsive to said fourth signal, said counter means generating a fifth signal for sequentially energizing selected driver pairs in a predetermined sequence, said counter means enabling said output means when the frequencies in the sequence of said addressing digit signals applied to said input means corresponds to the frequencies to which said first, second, third and fourth tuned networks are sequentially responsive.

11. The decoding system as claimed in claim 10 including change-over circuit means operatively connected to said first and second detecting means, said control signal including a first frequency in said second group of frequencies, said second decoding means tuned to be responsive to a second frequency in said second group of frequencies, said change-over circuit means enabled by said first detecting means, said enabled change-over circuit means operating to energize said second decoding means for forming a fifth tuned network responsive to said first frequency in said second group of frequencies.

12. The decoding system as claimed in claim 8 wherein said control means includes counter means operatively connected to said first and second decoding means, said counter means generating counter signals for sequentially energizing said first and second decoding means, said counter means enabling said output means when the frequencies in the sequence of said addressing digit signals applied to said input means corresponds to the frequencies to which said first, second, third and fourth tuned networks are sequentially responsive.

* * * * *